June 26, 1956
W. H. BIXBY
2,752,551
REGULATED RECTIFYING APPARATUS
Filed Feb. 23, 1955
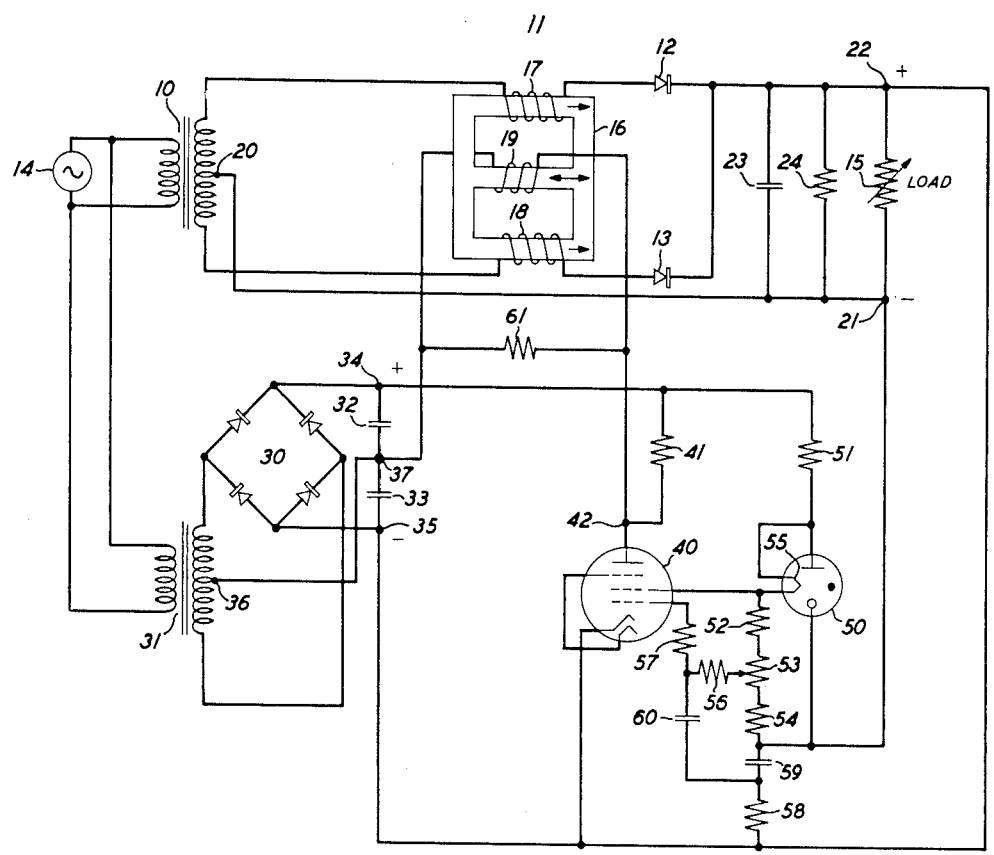
INVENTOR
W. H. BIXBY
BY
*G. F. Heuerman*
ATTORNEY

United States Patent Office 2,752,551
Patented June 26, 1956

2,752,551

REGULATED RECTIFYING APPARATUS

William H. Bixby, Detroit, Mich., assignor to Donald R. Middleton and Stanley M. Hanley, doing business as Power Equipment Company, a copartnership, Detroit, Mich.

Application February 23, 1955, Serial No. 489,913

5 Claims. (Cl. 321—18)

This invention relates to current supply apparatus and particularly to apparatus for controlling the supply of rectified current from an alternating-current supply source to a load.

An object of the invention is to provide improved apparatus for controlling the supply of rectified current to a load to minimize load voltage changes.

This invention is an improvement over the current supply apparatus disclosed and claimed in my copending application, Serial No. 330,853, filed January 12, 1953.

In a specific embodiment of the invention herein shown and described for the purpose of illustration, a saturating reactor having an impedance winding and a control winding is provided for controlling the supply of rectified current to a load. The impedance winding is connected in series with an alternating-current supply source, a rectifying element and a load so that unidirectional current flowing through the impedance winding sets up a first unidirectional magnetomotive force in the magnetic circuit of the reactor to reduce the impedance of the impedance winding. Reversible direct current is supplied to the control winding under control of the load voltage. Current supplied through the control winding in one direction causes to be set up in the magnetic circuit a second magnetomotive force which opposes the first magnetomotive force thereby increasing the impedance of the impedance winding and reducing the load current and voltage. Current supplied in the opposite direction through the control winding causes the second magnetomotive force set up in the magnetic circuit to aid the first magnetomotive force thereby reducing the impedance of the impedance winding and increasing the load current and voltage. The circuit is designed particularly for regulating a load voltage of low amplitude, say 8.0 volts, for example. It is desired to maintain the load voltage within limits of a few per cent. Therefore, the maximum load voltage change may be only a fraction of a volt. The regulator therefore utilizes means including a space current amplifier for controlling the current supplied to the saturating winding of the saturable reactor.

Space current is supplied through a resistor to the amplifying tube from an auxiliary rectifier having positive and negative terminals and an intermediate terminal having a potential preferably about midway between the potentials of the positive and negative terminals. The control winding of the saturable reactor is connected between the intermediate terminal of the auxiliary rectifier and the terminal of the resistor which is connected to the anode of the space current tube.

When the voltage across the load has a predetermined value, zero current flows through the saturating or control winding of the reactor. For this condition the potential of the anode of the amplifier tube is equal to the potential of the intermediate terminal of the rectifier. Making the control electrode of the amplifier tube relatively more negative with respect to its cathode in response to an increase of load voltage causes current to flow in a first direction through the reactor control winding to increase the impedance of the impedance winding of the reactor and thereby minimize the increase of load voltage. When a reduction of load voltage from the predetermined value occurs, the control electrode of the amplifier tube becomes relatively less negative with respect to its cathode with the result that current flows in the opposite direction through the reactor control winding, thereby decreasing the impedance of the impedance winding and minimizing the assumed reduction of load voltage.

The invention will now be described in greater detail with reference to the accompanying drawing, the single figure of which is a schematic view of a current supply circuit embodying the invention.

Referring to the drawing, there is provided a current supply circuit comprising a transformer 10, a saturable reactor 11 and rectifying elements 12 and 13 for supplying rectified current from an alternating-current supply source 14 to a load 15 which may vary. The current supply circuit is designed particularly for supplying direct current to a load at relatively low voltage, 8.0 volts, for example. The saturable reactor 11 comprises a three-legged core 16 of magnetic material, impedance windings 17 and 18, each having 48 turns, for example, on the outer legs, respectively, of the core and a saturating or control winding 19 of 500 turns, for example, on the middle leg of the core. The transformer 10 has a primary winding connected to the alternating-current supply source 14 and a secondary winding, a mid-terminal 20 of which is connected to the negative load terminal 21. The end terminals of the secondary winding of transformer 10 are connected to one terminal of reactor winding 17 and to one terminal of reactor winding 18, respectively. The other terminal of winding 17 is connected through the rectifying element 12 to the positive load terminal 22 and the other terminal of winding 18 is connected through rectifying element 13 to the positive load terminal. A filtering condenser 23 of 90,000 microfarads, for example, and a bleeder resistor 24 of 8.0 ohms, for example, are each connected across the load 15.

Current which may vary in amplitude and direction is supplied to the reactor winding 19 from an auxiliary bridge rectifier 30. Current is supplied to the input of rectifier 30 from the alternating-current supply source 14 through a transformer 31. Similar condensers 32 and 33 each of 4 microfarads, for example, are connected in series in a current path across the positive and negative output terminals 34 and 35, respectively, of rectifier 30 and a mid-tap 36 of the secondary winding of transformer 31 is connected to the common terminal 37 of condensers 32 and 33. There is provided a space current amplifier tube 40 having a cathode connected to the negative terminal 35 of rectifier 30 and an anode connected through a resistor 41 of 25,000 ohms, for example, to the positive terminal 34 of rectifier 30. The common terminal 42 of resistor 41 and the anode of tube 40 is connected to one terminal of control winding 19 of reactor 11 and the common terminal 37 of condensers 32 and 33 is connected to the other terminal of winding 19. A resistor 61 of 5000 ohms, for example, is provided in a path connecting terminals 37 and 42 in shunt with the control winding 19. The potential of terminal 37 with respect to the potential of the negative rectifier output terminal 35 is approximately one-half the potential of the positive rectifier output terminal 34 with respect to the potential of the negative rectifier terminal 35. It will be noted also that when zero current flows through the control winding 19, the potential of terminal 42 is the same as the potential of terminal 37.

There is provided a cold cathode, gas-filled constant voltage device 50 having an anode which is connected through a resistor 51 of 6700 ohms, for example, to the positive terminal 34 of auxiliary rectifier 30. The cathode of the constant voltage tube 50 is connected to the negative load terminal 21 and the positive load terminal 22 is connected to the negative terminal 35 of auxiliary rectifier 30, thus completing a current path for energizing the tube 50 to set up a substantially constant voltage across its terminals. There is connected across the anode-cathode path of tube 50 through a conductor 55 in the base of tube 50 a voltage divider current path comprising in series a resistor 52 of 15,000 ohms, for example, a potentiometer 53 of 1000 ohms, for example, and a resistor 54 of 150 ohms, for example. The variable tap of potentiometer 53 is connected through a resistor 56 of 50,000 ohms, for example, and a resistor 57 of 20,000 ohms, for example, to the control electrode of tube 40. There is thus completed a circuit for impressing between the control grid and the cathode of tube 40 a voltage having as components the voltage across the load 15 and in opposition thereto a portion at least of the relatively constant voltage across the constant voltage tube 50. The control grid-cathode voltage of tube 40 thus has variations corresponding to load voltage variations. There is also impressed between the screen grid and the cathode of tube 40 a voltage having as components the voltage across the load 15 and in opposition thereto the voltage across the constant voltage tube 50. The load voltage changes are thus impressed not only upon the control grid-cathode circuit of tube 40, but also upon the screen grid-cathode circuit of the tube in the same sense to obtain maximum advantage of the available transconductance within the tube. There is connected across the load 15 a resistor 58 of 50,000 ohms, for example, and in series therewith a condenser 59 of 0.25 microfarad, for example. The common terminal of resistor 58 and condenser 59 is connected through a condenser 60 of 0.5 microfarad to the common terminal of resistors 56 and 57.

When the voltage across the load 15 increases, for example, the control grid is made more negative and the screen grid is made less positive with respect to the cathode of tube 40 to decrease the space current of the tube. As a result, the potential of the terminal 42 becomes more positive than the potential of terminal 37 to cause a flow of current from positive terminal 34, through resistor 41 and through the winding 19 in the direction from terminal 42 to terminal 37. The resulting magnetomotive force set up in the core 16 due to the current through winding 19 opposes the magnetomotive force set up due to each of the windings 17 and 18 to increase the impedances of windings 17 and 18. The assumed increase of load voltage is thus minimized. If on the other hand, the load voltage should decrease, the control grid is made less negative and the screen grid of tube 40 is made more positive with respect to the cathode and the terminal 42 becomes relatively more negative with respect to terminal 37. Current thus flows from terminal 37, through control winding 19 in the direction from terminal 37 to terminal 42 and through the space current path of tube 40 to set up a magnetomotive force in core 16 which aids the magnetomotive forces due to windings 17 and 18, thereby decreasing the impedances of windings 17 and 18 to minimize the assumed decrease of load voltage.

What is claimed is:

1. In combination, a saturable reactor having first and second windings on a core of magnetic material, said second winding having a first and a second terminal, a rectifier, means for supplying unidirectional current from an alternating-current supply source through said first winding and said rectifier in series to a load, an auxiliary direct-current source having a positive and a negative terminal and a first intermediate terminal having a potential intermediate said positive and negative terminals, a space current device having a space current path between a pair of electrodes and having control means for controlling the resistance of said space current path, a current path connecting said positive and negative terminals comprising said space current path and resistance means in series therewith, said current path having a second intermediate terminal having a potential intermediate said positive and negative terminals, means for connecting the first and second terminals of said second winding to said first and second intermediate terminals, respectively, and means for controlling said control means to control the current in said second winding to thereby regulate the load current.

2. In combination, a saturable reactor having first and second windings on a core of magnetic material, said second winding having first and second terminals, a rectifier, means for supplying current from an alternating-current supply source the voltage of which may vary through said first winding and said rectifier in series to a load circuit comprising a load to set up a unidirectional voltage across said load, an auxiliary direct-current source having a positive and a negative terminal and a third terminal having a potential intermediate the potentials of said positive and negative terminals respectively, a resistor, a space current device having a space current path between a pair of electrodes and having control means for controlling the resistance of said space current path, a current path connecting said positive and negative terminals comprising in series said resistor and said space current path, means for connecting said first terminal of said second winding to said third terminal of said auxiliary current source, means for connecting said second terminal of said second winding to the common terminal of said resistor and one of said pair of electrodes, and means for deriving from said load circuit and impressing upon said control means a voltage having variations corresponding to load voltage changes for causing said load voltage changes to be minimized.

3. In combination, a saturable reactor having a first and a second winding, a rectifier, means for supplying current from an alternating-current supply source through said first winding and said rectifier in series to a load, a direct-current source having a positive and a negative terminal and an intermediate terminal having a potential intermediate the potentials of said positive and negative terminals, respectively, a resistor, a space current device having an anode, a cathode and a control electrode, means for connecting said anode through said resistor to said positive terminal, means for connecting said cathode to said negative terminal, means for connecting said second winding in a current path connecting said intermediate terminal and the anode of said space current device, a constant voltage device, means for impressing upon a circuit including said constant voltage device the sum of the voltage of said direct-current source and the voltage across said load to cause a substantially constant voltage to be set up across said constant voltage device and means for impressing upon the control electrode with respect to the cathode of said space current device a voltage equal to the difference of said load voltage and a portion, at least, of the voltage across said constant voltage device.

4. A combination in accordance with claim 3 in which said space current device comprises a screen grid and in which means are provided for impressing upon said screen grid with respect to said cathode a voltage equal to the difference of said load voltage and the voltage across said constant voltage device.

5. In combination, a first and a second transformer each having a secondary winding and a primary winding adapted to be supplied with alternating current, a saturable reactor comprising a three-legged core of magnetic material, first and second windings on the outer legs, respectively, of said core and a third winding on the middle leg of said core, a first and a second rectifying element, a load, means for supplying direct current to said load comprising means including said first rectifying element for supplying current from the secondary of said first transformer through said first winding and said load in series during periods of one polarity of said alternating current and means including said second rectifying element for supplying current from the secondary of said first transformer through said second winding and said load in series during periods of opposite polarity of said alternating current, fluxes due to currents supplied to said first and second windings, respectively, flowing in the same direction through said middle leg of the core, a bridge rectifier having a pair of input terminals and positive and negative output terminals, the secondary of said second transformer having a pair of end terminals connected to the input terminals, respectively, of said bridge rectifier and having a mid-terminal, means for connecting said mid-terminal to a first terminal of said third reactor winding, a first resistor, a space current device having an anode, a cathode, a control grid and a screen grid, means comprising said first resistor for connecting said anode to said positive output terminal, means for connecting said cathode to said negative output terminal, means for connecting the common terminal of said first resistor and said anode to the second terminal of said third reactor winding, a constant voltage device, a second resistor, means for impressing upon a current path comprising said second resistor and said constant voltage device in series a voltage equal to the sum of the output voltage of said bridge rectifier and the voltage across said load, means for impressing upon the control grid-cathode path of said space current device a voltage equal to the difference of said load voltage and a portion at least of the voltage across said constant voltage device, and means for impressing upon the screen grid-cathode path of said space current device a voltage equal to the difference of said load voltage and the voltage across said constant voltage device.

References Cited in the file of this patent
UNITED STATES PATENTS

| | | |
|---|---|---|
| 2,331,131 | Moyer | Oct. 5, 1943 |
| 2,488,321 | Owen | Nov. 15, 1949 |
| 2,503,880 | Mah | Apr. 11, 1950 |
| 2,511,219 | Pogorzelski | June 13, 1950 |
| 2,555,544 | Holt | June 5, 1951 |
| 2,569,500 | Sorensen | Oct. 2, 1951 |
| 2,635,222 | Granger | Apr. 14, 1953 |
| 2,682,635 | Henrich | June 29, 1954 |